United States Patent
May et al.

(10) Patent No.: US 9,150,258 B1
(45) Date of Patent: Oct. 6, 2015

(54) VEHICLE BODY STRUCTURE AND METHOD FOR ASSEMBLING SAME

(71) Applicant: FORD GLOBAL TECHNOLOGIES, LLC, Dearborn, MI (US)

(72) Inventors: Christopher John May, Novi, MI (US); Vincent Chimento, Plymouth, MI (US); Darrin Neil Wagner, Bloomfield Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/315,050

(22) Filed: Jun. 25, 2014

(51) Int. Cl.
*B62D 27/02* (2006.01)
*B62D 25/04* (2006.01)

(52) U.S. Cl.
CPC .............. *B62D 27/023* (2013.01); *B62D 25/04* (2013.01)

(58) Field of Classification Search
CPC .............................. B62D 27/023; B62D 25/04
USPC .............................. 296/193.06, 29; 29/897.2
See application file for complete search history.

(56) References Cited

U.S. PATENT DOCUMENTS

| | | | |
|---|---|---|---|
| 5,382,071 A | 1/1995 | Enning et al. | |
| 6,279,990 B1 | 8/2001 | Miyasaka et al. | |
| 8,272,682 B2 | 9/2012 | Cimatti | |
| 8,496,288 B2 * | 7/2013 | Juettner et al. | 296/193.05 |
| 8,641,133 B1 | 2/2014 | Scaringe et al. | |
| 2010/0019546 A1 * | 1/2010 | Stephens | 296/218 |
| 2011/0127802 A1 | 6/2011 | Kim et al. | |
| 2012/0299334 A1 | 11/2012 | Takayama et al. | |
| 2013/0140851 A1 | 6/2013 | Zörnack et al. | |
| 2013/0195579 A1 | 8/2013 | Freis | |
| 2013/0241239 A1 * | 9/2013 | Mori | 296/193.06 |
| 2013/0278023 A1 * | 10/2013 | Nakayama et al. | 296/203.03 |
| 2014/0300139 A1 * | 10/2014 | Torii | 296/187.12 |
| 2015/0001885 A1 * | 1/2015 | Saje et al. | 296/193.07 |
| 2015/0001892 A1 * | 1/2015 | Saje et al. | 296/203.03 |
| 2015/0003902 A1 * | 1/2015 | Saje et al. | 403/306 |
| 2015/0004342 A1 * | 1/2015 | Saje et al. | 428/36.9 |
| 2015/0101458 A1 * | 4/2015 | Saje et al. | 81/121.1 |

* cited by examiner

*Primary Examiner* — Jason S Morrow
(74) *Attorney, Agent, or Firm* — Raymond L. Coppiellie; Brooks Kushman P.C.

(57) ABSTRACT

A modular body structure and a method for assembling a body structure in a vehicle includes fitting a pillar having first and second ends between a roof rail and a lower support such that the first end is disposed below a top of the roof rail. The pillar is fastened to the roof rail and the lower support with first threaded fasteners by friction drilling holes through the pillar and the roof rail and the lower support.

16 Claims, 3 Drawing Sheets

VEHICLE BODY STRUCTURE AND METHOD FOR ASSEMBLING SAME

TECHNICAL FIELD

The present invention relates to a vehicle body structure and a method for assembling a vehicle body structure.

BACKGROUND

Pickup trucks are motor vehicles with a front passenger area, often referred to as a cab, and an open top rear cargo area, often referred to as a box. The box usually has a substantially flat bed from which two sidewalls and a forward interconnecting headboard extend upwardly therefrom. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in so many different ways, including carrying a variety of types of cargo and towing various types of trailers.

Traditionally the majority of body structures on pickup trucks have been formed from steel alloys. Through years of experience, pickup truck designers have learned how to engineer steel truck body parts that withstand the variety of demanding pickup truck applications. The current regulatory and economic environments have increased the importance of making pickup trucks more fuel efficient as well as functional and durable. One way to reduce the fuel consumption of a vehicle is to reduce vehicle structure weight.

Aluminum alloys typically have a higher strength to weight ratio than steel alloys. Consequently, replacing steel with aluminum offers the potential for weight reduction; however, the elastic modulus of aluminum is generally lower than the elastic modulus of steel. In addition, fabrication techniques and methods of joining parts that work well for steel parts may not work well for the same aluminum part. Because of these and other differences, simple material substitution does not necessarily produce an acceptable design.

Aluminum alloys are generally identified by a four-digit number, the first digit of which typically identifies the major alloying element. When describing a series of aluminum alloys based on the major alloying element, the first number may be followed by three x's (upper or lower case) or three 0's (zeros). For example, the major alloying elements in 6xxx or 6000 series aluminum alloy are magnesium and silicon, while the major alloying elements of 5xxx or 5000 and 7xxx or 7000 series is magnesium and zinc, respectively. Additional numbers represented by the letter 'x' or number '0' in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

There are also five basic temper designations that may be used for aluminum alloys, which are: F, as fabricated; O, annealed; H, strain hardened; T, thermally treated; and W, as quenched. The temper designation may be followed by a single or double digit number for further delineation. For example, aluminum with a T6 temper designation has been solution heat treated and artificially aged, but not cold worked after the solution heat treatment, or such that cold working would not be recognizable in the material properties.

As noted above, one of the benefits of using aluminum alloys is their high strength to weight ratio; however, such alloys tend to be more expensive than traditional steel alloys. Therefore, to the extent that higher cost alloys are used in a vehicle, such as a truck, it would be desirable to have a modular construction to allow replacement of components on a more individualized basis. One portion of a vehicle that could benefit from such a construction is in regard to the pillars which extend between a roof rail and a lower support such as a rocker. Conventional pillars may wrap around one or both of the roof rail or rocker, and may be, for example, welded in place. In case of damage to a pillar, conventional designs may require replacement of the rocker supports and even the entire roof rail structure. Therefore, a need exists for a modular vehicle body structure that facilitates replacement of such pillars without the need to replace all of the other structures to which they are attached.

SUMMARY

At least some embodiments of the present invention may include a method for assembling a body structure in a vehicle. The method may include fitting a pillar having first and second ends between a roof rail and a lower support. The pillar is positioned such that the first end is disposed below a top of the roof rail. The pillar is fastened to the roof rail and the lower support with first threaded fasteners by friction drilling holes through the pillar and the roof rail and the lower support. As explained in more detail below, the friction drilling may be effected by using flow drill screws.

At least some embodiments of the present invention may include a method for assembling a body structure in a vehicle. The method may include attaching respective ends of an outside pillar to a roof rail and a lower support with first threaded fasteners. Other steps may include attaching a pillar flange on an inside portion of the roof rail with second threaded fasteners, and attaching respective ends of an inside pillar to the pillar flange and an inside portion of the lower support with third fasteners. The third fasteners need not be threaded fasteners since a back side of the third fasters can be made accessible; therefore, a fastener such as, for example, a self-piercing rivet (SPR) or a blind rivet can be used and the connection between the inside pillar and the pillar flange, and the inside pillar and the lower support, can still be disconnected for repair.

At least some embodiments of the present invention may include a modular body structure for a vehicle that includes an outside pillar having first and second ends disposed between a roof rail and a lower support, the first and second ends being respectively attached directly to the roof rail and the lower support without a support structure disposed between the pillar and the lower support. Each of the first and second ends is respectively attached to the roof rail and the lower support with first threaded fasteners.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
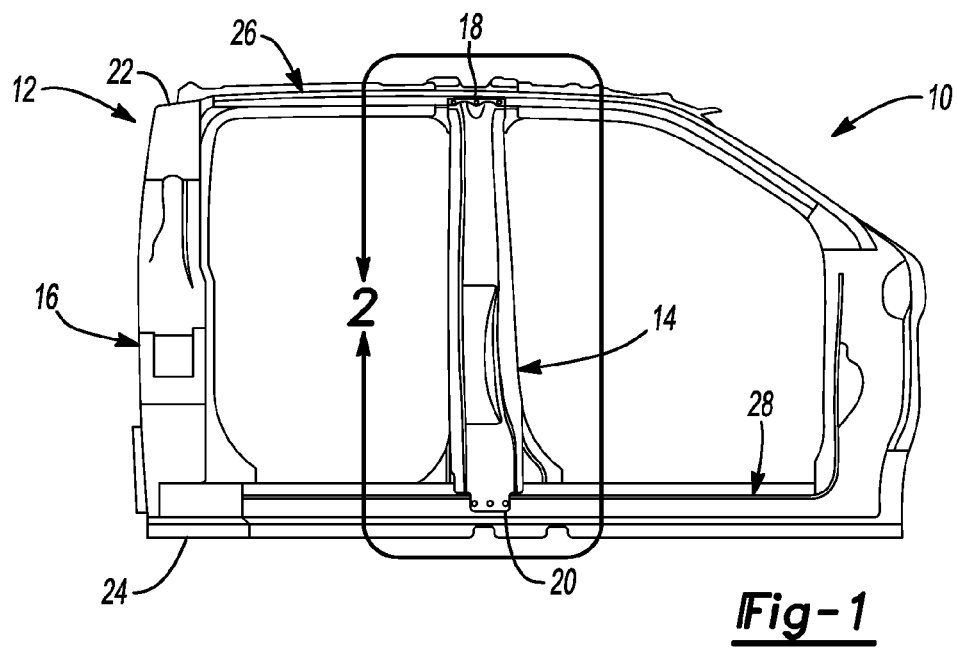
FIG. 1 shows a modular body structure, and in particular, an outside pillar of a crew cab truck, in accordance with embodiments of the present invention.

FIG. 1 shows a portion of a vehicle 10, which has a modular body structure 12 in accordance with embodiments of the present invention. In particular, the body structure 12 includes B and C pillars 14, 16, which, in the embodiment shown in FIG. 1, are part of a crew cab pickup truck—i.e., a truck having a cab compartment which is typically large enough to accommodate a second row of seats. Although the rearmost pillar, pillar 16, is configured differently from the B pillar, pillar 14, it may be that in some vehicles—e.g., a truck having a standard cab—the B pillar is the rearmost pillar, and therefore may be configured the same or very similar to the pillar 14 shown in FIG. 1.

The pillars 14, 16 shown in FIG. 1 are outside pillars, and, as explained in more detail below, may be configured differently from the corresponding B and C pillars on the inside of the vehicle 10. The pillar 14 includes first and second ends 18, 20; similarly, the pillar 16 includes first and second ends 22, 24. As shown in FIG. 1, each of the first ends 18, 22 is attached to a roof rail 26 of the vehicle 10. Each of the second ends 20, 24 of the pillars 14, 16 is attached to a lower support or rocker 28 of the vehicle 10.

Figure 2:
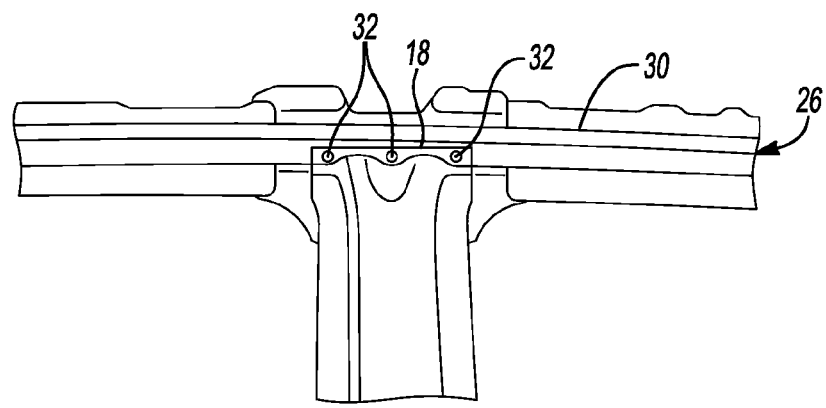
FIG. 2 shows a detailed view of the outside pillar shown in FIG. 1.
Figure 2:
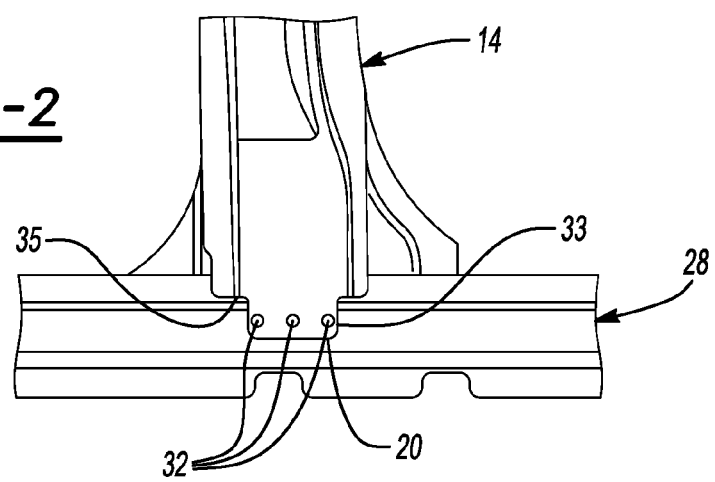

FIG. 2 shows a detailed view of the pillar 14 from FIG. 1. As shown in FIG. 2, the first end 18 of the pillar 14 is disposed below a top portion 30 of the roof rail 26. In particular, the first end 18 is not wrapped around the roof rail 26, which, as explained below, provides advantages for installation and replacement. In addition, because the first end 18 of pillar 14 is disposed generally under the roof rail 26, it provides support for vertical forces coming through the roof rail 26. The vehicle 10 may have a body manufactured at least substantially from a lightweight high-strength alloy, such as an aluminum alloy, and in particular a 6000 series aluminum alloy. One of the advantages of using such material is that it provides opportunities for manufacturing processes not available when more traditional steel alloys are used. For example, friction drilling can be employed to provide a fast mechanism for fastening the pillar 14 to the roof rail 26 and rocker 28.

Although the friction drilling process may take place in multiple steps, it may also be possible to use a "flow drill screw", which performs the friction drilling, threading and fastener insertion in a seamless process. For example, in methods in accordance with at least some embodiments of the present invention, the first and second ends 18, 20 of the pillar 14 may be fitted between the roof rail 26 and the rocker 28. With the ends 18, 20 in contact with the roof rail 26 and the rocker 28, respectively, flow drill screws may be used to friction drill holes through the roof rail 26 and the rocker 28, and after the friction drilling process builds up the otherwise thin material of the roof rail and the rocker, the self-tapping threads of the flow drill screws cut threads into their respective holes and fasten the pillar 14 to the roof rail 26 and rocker 28. The flow drill screws 32 shown in FIG. 2 respectively attach the first end 18 and second end 20 of the pillar 14 to the roof rail 26 and the rocker 28. For convenience, the flow drill screws 32 may be referred to as "first threaded fasteners"; however, merely because they are all labeled with the same number does not indicate that they are all the same size or type.

As shown in FIG. 2, the pillar 14, which is an outside pillar, is attached directly to the roof rail 26 in the rocker 28 without any intervening support structure—i.e. there is no support structure disposed between the pillar 14 and the roof rail 26 or between the pillar 14 and the rocker 28. This is one of the advantages of using threaded fasteners, and in particular threaded fasteners in conjunction with friction drilling, to install a modular body structure in a vehicle, such as the pillar 14: the pillar 14 itself can be quickly and efficiently threaded directly into body components of the vehicle 10, such as the roof rail 26 and the rocker 28. In applications where the components are steel, for example, the use of threaded fasteners may not be possible. This is because the roof rail 26 and the rocker 28 are closed sections, and as such, it is not possible to provide a weld nut or other mating component on the back side of the section wall—a requirement that is eliminated by the friction drilling process to which aluminum construction lends itself. The fasteners 32 attach the second end 20 of the pillar 14 to the rocker 28 through a tab 33, which extends outward from a bottom portion 35 of the pillar 14.

Figure 3:
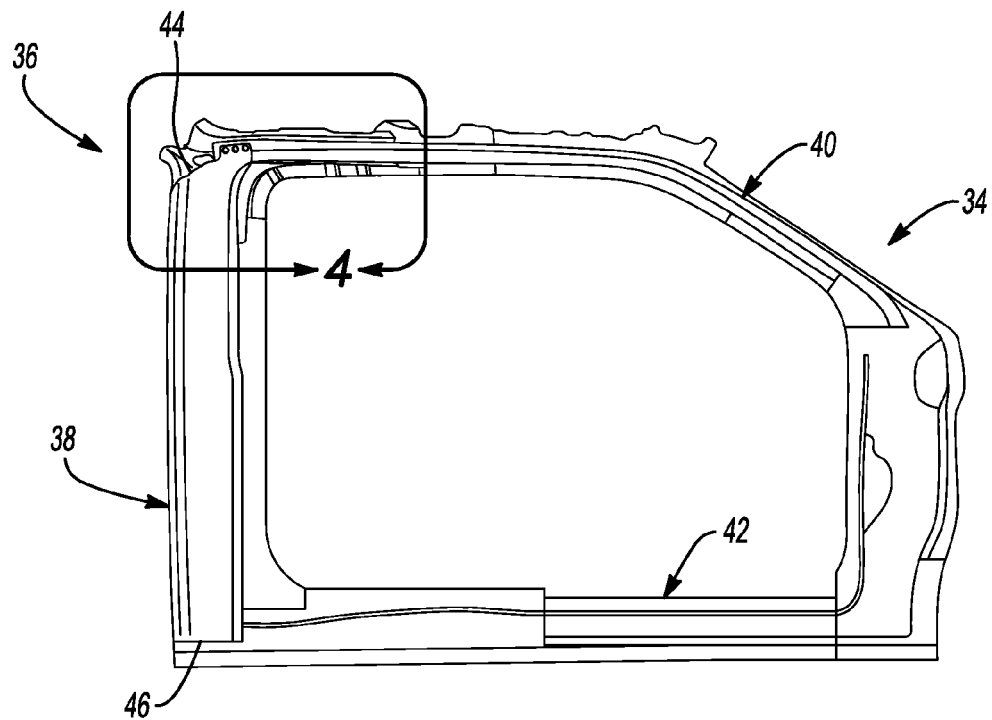
FIG. 3 shows a modular body structure, and in particular, a rearmost pillar of a super cab truck in accordance with embodiments of the present invention.
Figure 4:
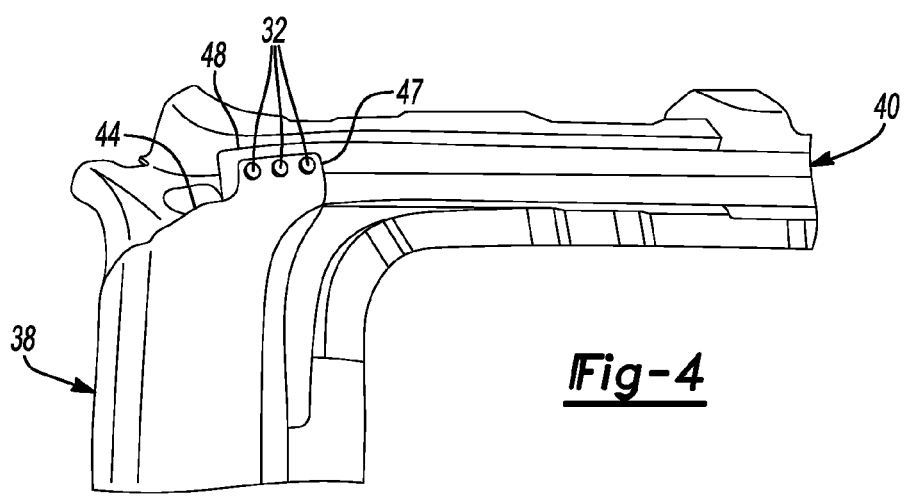
FIG. 4 shows a detailed view of the pillar shown in FIG. 3.

FIG. 3 shows a portion of a vehicle 34, which has a modular body structure 36 in accordance with embodiments of the present invention. In particular, the body structure 36 includes a rearmost pillar 38 disposed between a roof rail 40 and a lower support, or rocker 42. The configuration shown in FIG. 3 may be found, for example, in a pickup truck having a "super cab", which may be larger than a standard cab, but may not be large enough to fit a B-pillar with a second set of forward opening doors. The pillar 38 has first and second ends 44, 46 respectively disposed between the roof rail 40 and the rocker 42. The first end 44 is shown in more detail in FIG. 4. Specifically, the first end 44 of the pillar 38 is attached to the roof rail 40 through a tab 47 extending outward from a top portion 48 of the roof rail 38.

Similar to the attachment of the pillar 14 illustrated and described above, the pillar 38 is attached to the roof rail 40 through first threaded fasteners in the form of flow drill screws 32. Although not shown in detail, it is understood that the second end 46 of the pillar 38, as shown in FIG. 3, is attached to the rocker 42 with the first threaded fasteners in the form of flow drill screws 32. As with the embodiment shown in FIGS. 1 and 2, the flow drill screws 32 need not be all of the same size or type, and are given a common label for convenience.

Figure 5:
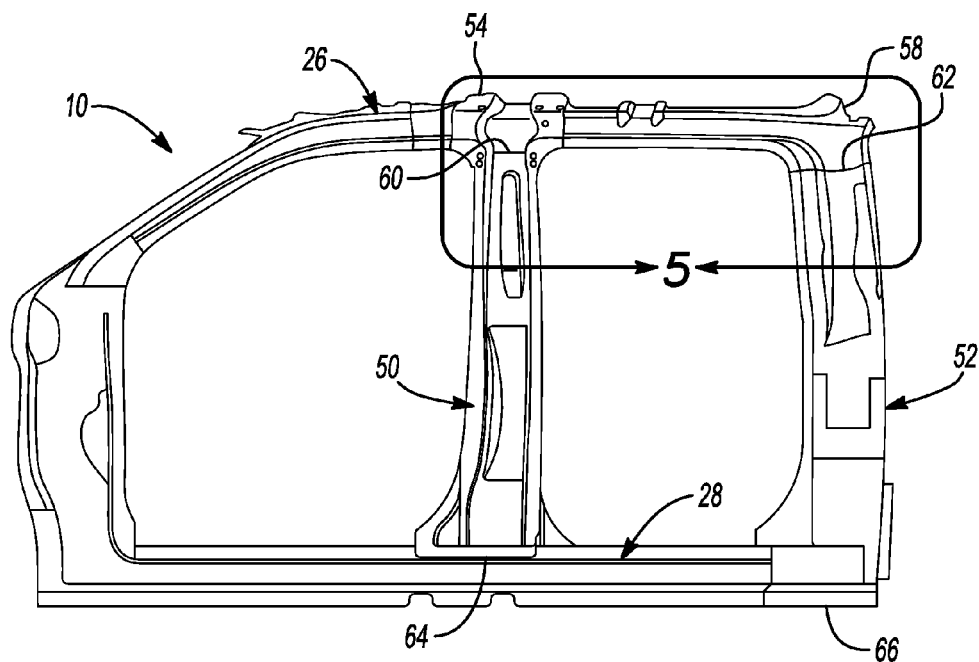
FIG. 5 shows a modular body structure, and in particular, inside pillars of a crew cab truck in accordance with embodiments of the present invention.

FIG. 5 shows an inside view of a portion of the vehicle 10, and in particular, it shows the inside pillar counterparts to the pillars 14, 16 shown in FIG. 1. Specifically, an inside B pillar 50 and an inside C pillar 52 are shown. Also shown in FIG. 5 is a flange 54, which, as explained in more detail below, is disposed between the roof rail 26 and the inside pillar 50. The inside pillar 52 also has a flange 58 disposed between it and the roof rail 26. Specifically, a first end 60 of the pillar 50 and a first end 62 of the pillar 52 are respectively attached to flanges 54, 58, while second ends 64, 66 of the pillars 50, 52 are attached to the rocker 28. As shown in FIG. 5, the second end 64 of the pillar 50 fans outward near its base where it is attached to the rocker 28; however, near the first end 60, it is generally straight. This provides advantages over having a one-piece inside pillar that has both ends fan outward in that less material is wasted during the stamping process, and pillars configured such as the pillar 50 can be packed close together, thereby providing a higher density package for material handling.

Figure 6:
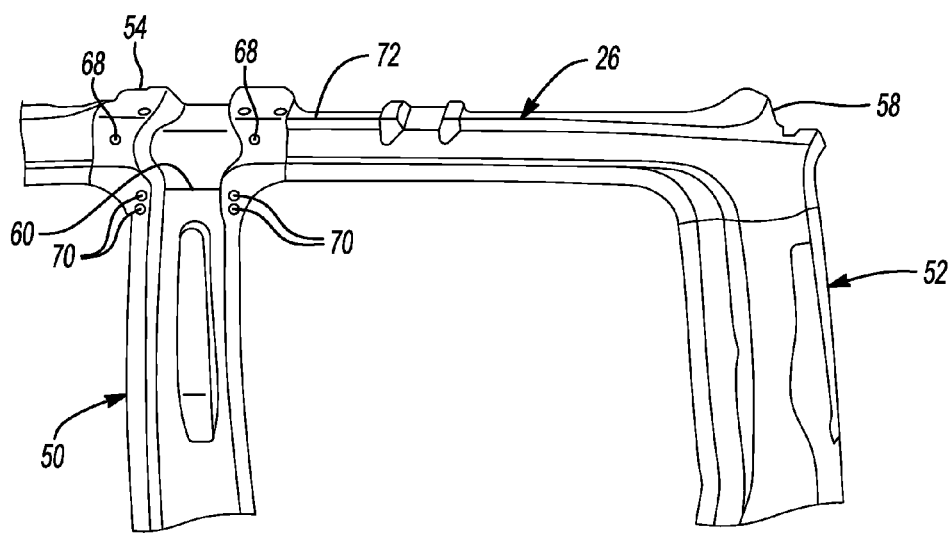
FIG. 6 shows a detailed view of the pillars shown in FIG. 5.

FIG. 6 shows the upper portions of the pillars 50, 52, and their respective flanges 54, 58. Similar to the attachment of the pillars 14, 16, 38 described above, the pillars 50, 52 and their respective flanges 54, 58, are attached to adjacent structures using threaded fasteners, which may be attached with a friction drilling process. So, for example, the flange 54 is attached to the roof rail 26 with flow drill screws 68, not all of which are labeled, and which may be conveniently referred to as second threaded fasteners to distinguish them from the first threaded fasteners 32 used on the outside pillars 14, 16. Even though all of the flow drill screws 68 have a common label, not all of them may be the same size or type. Conversely, in at least some embodiments, the first threaded fasteners 32 and the second threaded fasteners 68 may all be of the same size and type.

Also shown in FIG. 6, the first end 60 of the inside pillar 50 is attached to the flange 54 with self-piercing rivets 70, which may be conveniently referred to as third fasteners to distinguish them from the other fasteners described above. Not all of the third fasteners 70 need to be the same size or type; however, all of them could be the same size and type, depending on the application. Another advantage of embodiments of the present invention, including embodiments having the two-piece construction of the inside pillars and flanges as described above, is that relatively tall vehicles such as pickup trucks may sustain damage from an accident toward a lower portion of the vehicle, such that structural components near the roof rail may not be damaged at all. Therefore, even if an outside pillar, such as the pillar 14, or an inside pillar, such as the pillars 50, 52, are damaged at or near the rocker 28, they can be easily removed and replaced because they are not wrapped around the roof rail 26.

Embodiments of the present invention also include a method for assembling a body structure in a vehicle, such as the pillars described above. Using the outside pillar 14 and the inside pillar 50 and flange 54 as references, embodiments of the invention may include one or more of the following steps. A pillar, such as the pillar 14 can be fitted between the roof rail 26 and a lower support such as the rocker 28, such that the first end 18 of the pillar 14 is disposed below the top 30 of the roof rail 26. Then the pillar 14 may be fastened to the roof rail 26 and the rocker 28 with the first threaded fasteners 32 by friction drilling holes through the pillar 14 and the roof rail 26, and the pillar 14 and the rocker 28. Although the holes are not shown in their open state, it is understood that the fasteners 32 are inserted through the holes that are formed during the friction drilling process.

In the case where a pillar such as the pillar 14 is damaged, it may be possible to remove the pillar 14 and attach a replacement pillar between the roof rail 26 and the rocker 28 using new threaded fasteners. Conversely, in place of threaded fasteners, the replacement pillar may be attached using one or more blind rivets, such as a "pop rivet", which may also be further secured with a structural adhesive disposed between the replacement pillar and the roof rail 26 and/or rocker 28 at a location proximate the rivets. This same process may also be applied to a flange, such as the flange 54, or an inside pillar, such as the pillar 50. In case either or both of these components are damaged, a replacement flange or replacement inside pillar may be installed and fastened to its surrounding structure either with additional threaded fasteners, self-piercing rivets, or with blind rivets and/or structural adhesive. Other steps of a method may include attaching a pillar flange, such as the flange 54 to an inside portion 72 of the roof rail 26 with second threaded fasteners 68—see FIG. 6. As described above, a flange, such as the flange 54, may be attached to the roof rail by friction drilling a plurality of flange holes through the pillar flange 54 and an inside portion 72 of the roof rail 26, and fastening the pillar flange 54 to the roof rail 26 with the second threaded fasteners 68.

After the flange 54 is attached to the roof rail 26, the inside pillar 50 may then be fitted between the flange 54 and the rocker 28 and attached with the rivets 70. In summary, a process such as described above, may include the steps of friction drilling a plurality of outside pillar holes through an outside pillar, such as the pillar 14, and through the associated roof rail, such as the roof rail 26, and the associated lower support, such as the rocker 28. A plurality of flange holes may then be friction drilled through a pillar flange, such as the flange 54, and the associated roof rail 26. A plurality of inside pillar holes may be drilled through an inside pillar, such as the pillar 50, and the flange 54, and through the pillar 50 and the rocker 28, to accept blind rivets; alternatively, self-piercing rivets may be used for the inside pillar connections. Each of the holes created with the friction drilling process is configured to receive the corresponding threaded fasteners, which, as described above, may be a flow drill screw capable of performing the friction drilling, tapping and screw inserting process without additional tools or separating the steps. In this way, a modular body structure capable of individual component replacement is created, thereby reducing replacement and repair costs and providing for efficient assembly and reassembly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for assembling a body structure in a vehicle, comprising:
   fitting a pillar having first and second ends between a roof rail and a lower support such that the first end is disposed below a top of the roof rail;
   fastening the pillar to the roof rail and the lower support with first threaded fasteners by friction drilling holes through the pillar and the roof rail and the lower support;
   fitting a pillar flange on an inside portion of the roof rail;
   friction drilling a plurality of flange holes through the pillar flange and the roof rail;
   fastening the pillar flange to the roof rail with a plurality of second threaded fasteners, each engaging a respective one of the flange holes;
   fitting an inside pillar between the pillar flange and an inside portion of the lower support; and
   fastening the inside pillar to the pillar flange and the lower support with a plurality of third fasteners.

2. The method of claim 1, wherein the pillar is attached directly to the roof rail and the lower support without a support structure disposed between the pillar and the roof rail or between the pillar and the lower support.

3. The method of claim 1, further comprising removing the pillar and attaching a replacement pillar between the roof rail and the lower support with at least one blind rivet in a respective number of the holes.

4. The method of claim 3, further comprising applying adhesive between the replacement pillar and at least one of the roof rail or the lower support at a location proximate the at least one blind rivet.

5. The method of claim 1, further comprising forming the outside pillar, the inside pillar, and the pillar flange from a 6000 series aluminum alloy.

6. A method for assembling a body structure in a vehicle, comprising:
- attaching respective ends of an outside pillar to a roof rail and a lower support with first threaded fasteners through friction-drilled holes;
- attaching a pillar flange on an inside portion of the roof rail with second threaded fasteners through friction-drilled holes; and
- attaching respective ends of an inside pillar to the pillar flange and an inside portion of the lower support with third fasteners.

7. The method of claim 6, further comprising:
- drilling a plurality of inside pillar holes through the inside pillar and the pillar flange and the lower support configured to receive the third fasteners.

8. The method of claim 6, wherein attaching respective ends of an outside pillar to a roof rail and a lower support with first threaded fasteners includes attaching the outside pillar directly to the roof rail and the lower support without a support structure disposed between the pillar and the roof rail or between the pillar and the lower support.

9. The method of claim 8, wherein attaching respective ends of an outside pillar to a roof rail and a lower support with first threaded fasteners further includes disposing the first threaded fasteners through a tab extending outward from bottom portion of the outside pillar to the lower supports.

10. The method of claim 6, further comprising removing at least one of the outside pillar, the flange, or the inside pillar and attaching a respective replacement outside pillar, replacement flange or replacement inside pillar to at least one of the roof rail or the lower support with at least one blind rivet.

11. The method of claim 10, further comprising applying adhesive at a location proximate the at least one blind rivet.

12. The method of claim 6, further comprising forming the outside pillar, the inside pillar, and the pillar flange from a 6000 series aluminum alloy.

13. A modular body structure for a vehicle comprising:
- an outside pillar having first and second ends respectively attached directly to a roof rail and a lower support without a support structure disposed between the pillar and the roof rail or between the pillar and the lower support, each of the first and second ends being respectively attached to the roof rail and the lower support with first threaded fasteners;
- a flange attached directly to an inside portion of the roof rail without a support structure disposed between the flange and the roof rail, the flange being attached to the roof rail with second threaded fasteners; and
- an inside pillar having first and second ends disposed between the flange and the lower support, the first and second ends of the inside pillar being respectively attached directly to the flange and an inside portion of the lower support with third fasteners and without a support structure disposed between the inside pillar and the flange or between the inside pillar and the lower support.

14. The modular body structure of claim 13, wherein the first end of the outside pillar is disposed below a top of the roof rail.

15. The modular body structure of claim 13, wherein the second threaded fasteners are received by respective flange holes formed by friction drilling through the flange and the inside portion of the roof rail.

16. The modular body structure of claim 13, wherein the third fasteners are received by respective inside pillar holes formed drilling through the first end of the inside pillar and the flange, and the second end of the inside pillar and the inside portion of the roof rail.

* * * * *